Feb. 26, 1963

W. O LYTLE 3,078,693

METHOD AND APPARATUS FOR PRODUCING FILMED BENT GLASS SHEETS

Filed Dec. 30, 1959

INVENTOR.
WILLIAM O. LYTLE

BY Oscar L. Spencer
ATTORNEY

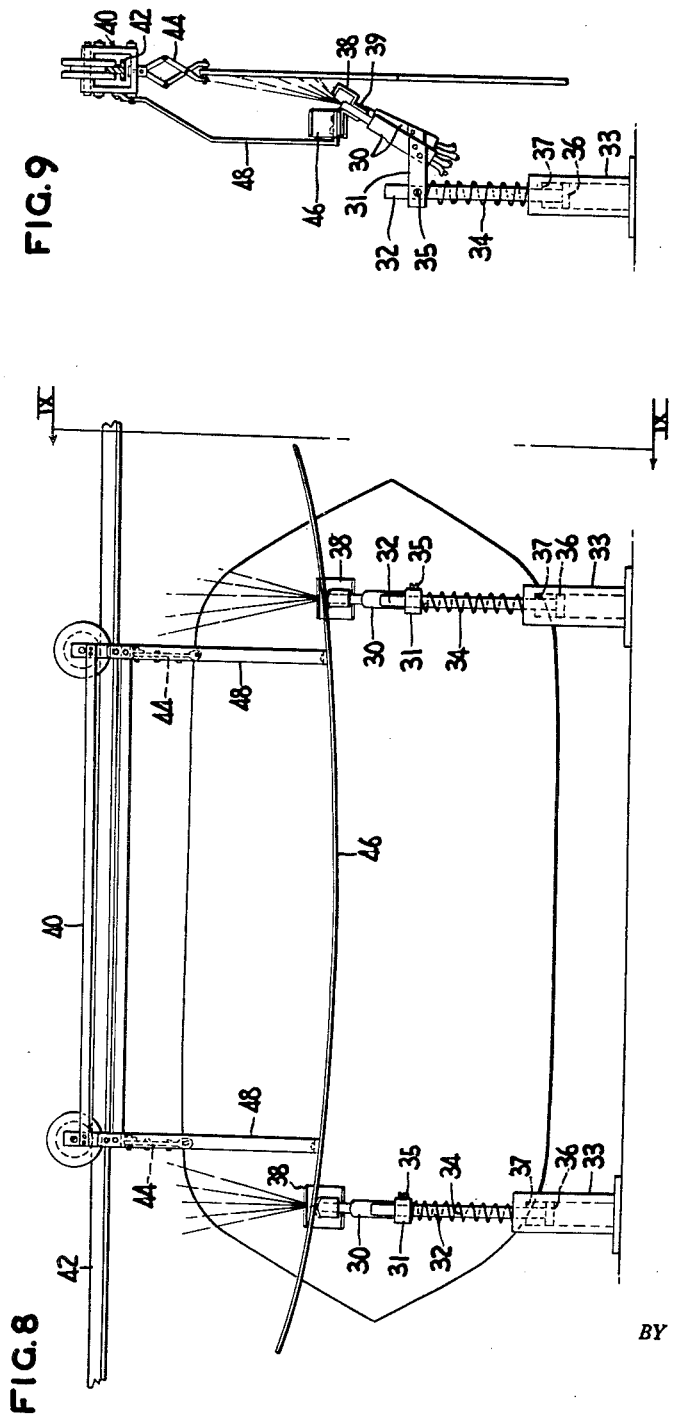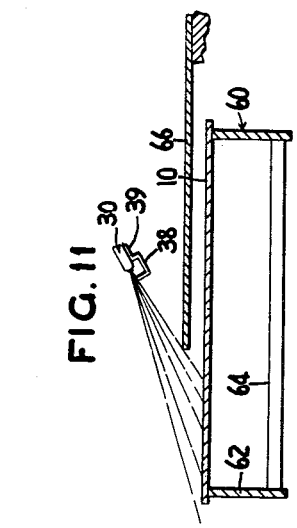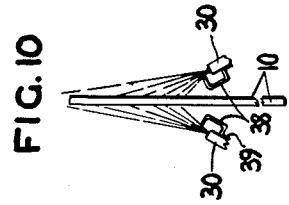

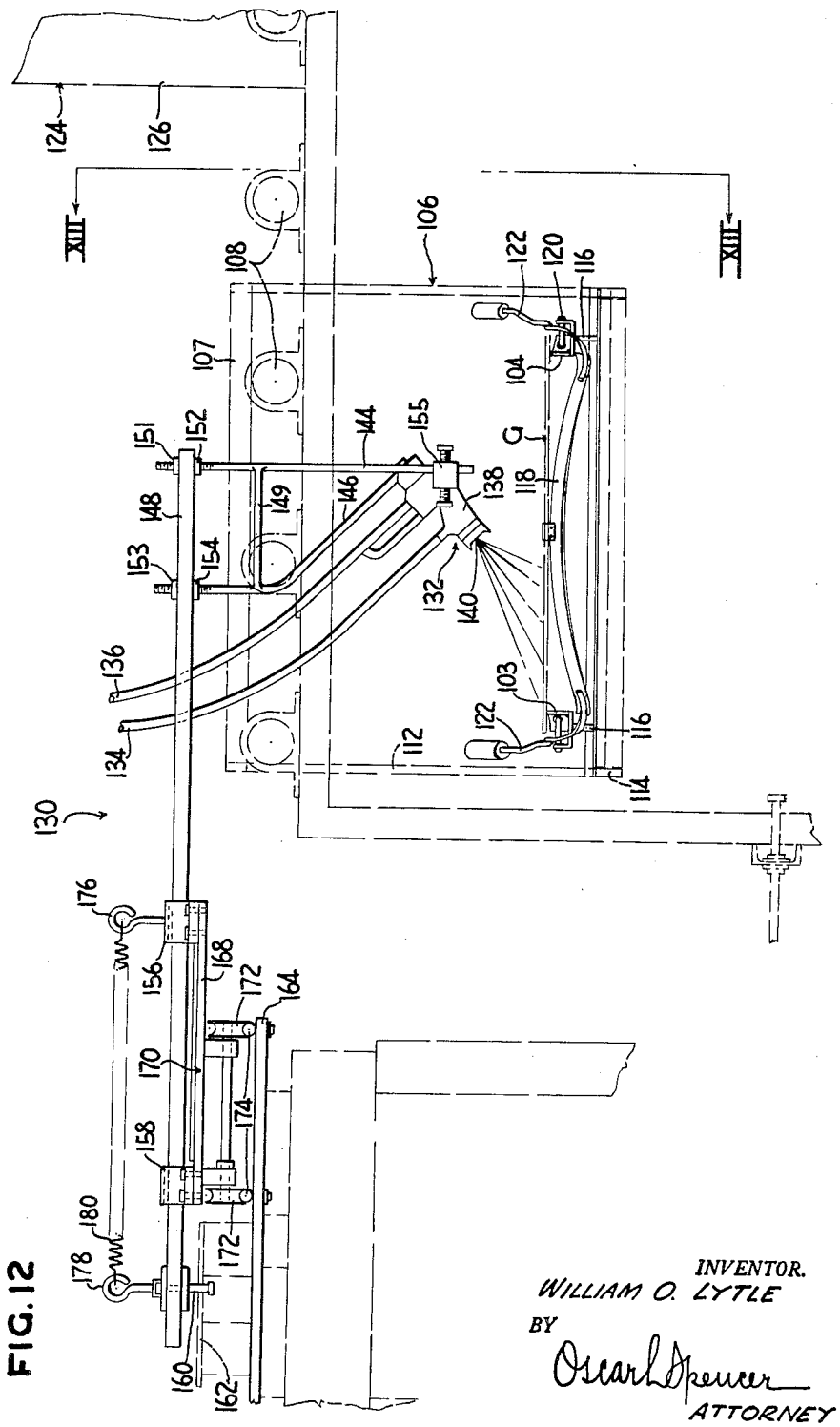

INVENTOR.
WILLIAM O. LYTLE
BY Oscar L. Spencer
ATTORNEY

Feb. 26, 1963
W. O. LYTLE
3,078,693
METHOD AND APPARATUS FOR PRODUCING
FILMED BENT GLASS SHEETS
Filed Dec. 30, 1959
5 Sheets-Sheet 5
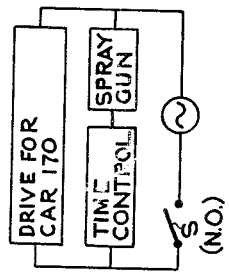
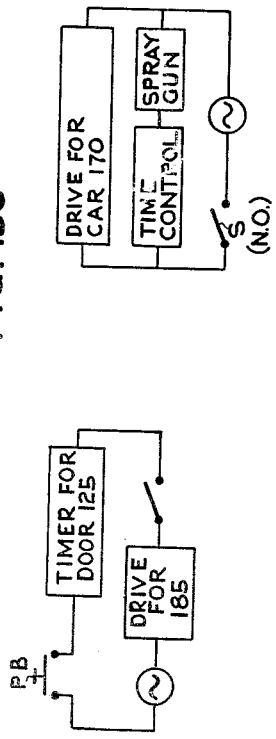
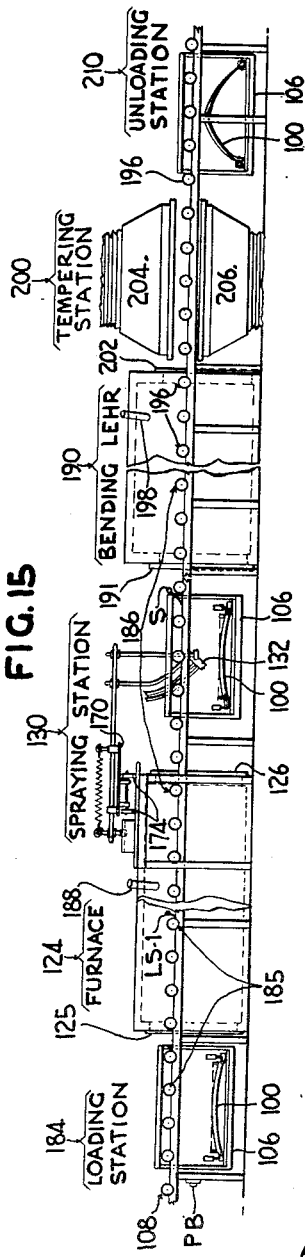
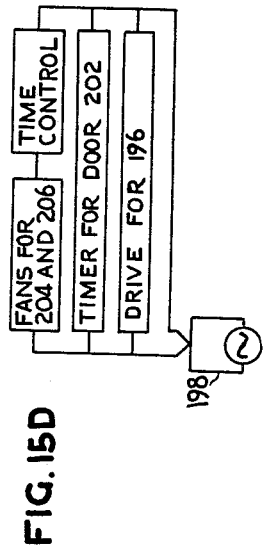
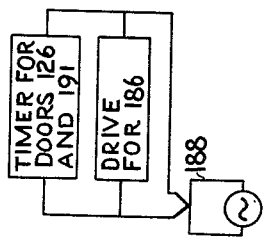
INVENTOR.
WILLIAM O. LYTLE
BY Oscar L. Spencer
ATTORNEY 3,078,693
METHOD AND APPARATUS FOR PRODUCING
FILMED BENT GLASS SHEETS
William O. Lytle, New Kensington, Pa., assignor to Pittsburgh Plate Glass Company, Allegheny County, Pa., a corporation of Pennsylvania
Filed Dec. 30, 1959, Ser. No. 862,868
11 Claims. (Cl. 65—60)

This application is a continuation-in-part of application Serial No. 606,341, filed August 27, 1956, for Article of Manufacture and its Method of Fabrication, now abandoned.

The present invention relates to an improved method and apparatus for producing filmed bent glass sheets and various articles comprising such filmed bent glass sheets which are particularly suitable for window closures for vehicles, particularly automobiles.

It is known that metal oxide films may be deposited upon glass by applying a composition containing a metal salt such as stannic chloride to the surface of heated glass. Films of superior conductivity may be produced by spraying plate, window or other glass while it is heated to a temperature above 400° F. but below the temperature at which the glass becomes molten, with tin tetrachloride or other tin salts in aqueous solution or in vapor state, in the presence of a reducing agent such as methanol, phenylhydrazine hydrochloride or other agents. The films thus obtained are of unknown composition, but appear to contain a preponderant amount, on the order of 97 to 99 percent of a tin oxide and certain impurities which may include metallic tin, carbon, silicon, sodium and chlorine and other impurities, depending upon the composition of the applied tin containing solution.

Articles having such films are useful in many fields. They have been found to be especially useful as viewing closures in automobiles, aircraft, trains and similar motive vehicles. In such use, bus bars are applied to the sheet filmed and the coating is placed in series with a source of electrical potential through these bus bars. The coating is used as a heating element in order to heat the viewing closure and prevent the deposition of ice, fog, etc. thereupon.

Metal oxide films on glass panels are also suitable for reducing heat transmission by absorbing and reflecting a substantial portion of heat and other radiation incident on the panel. Various metal oxide films are capable of producing the desired results. By applying filming compositions having a metal salt or certain mixtures thereof capable of forming a metal oxide film according to the teachings of the prior art, films which moderate the radiant energy transmittance of viewing closures can be produced.

Typical metal oxide coatings having low heat transmissivity by virtue of high absorptivity and/or reflectivity are those containing tin oxide, indium oxide, cadmium oxide, or mixtures thereof, mixtures of tin oxide and antimony oxide with or without minor additions of the oxides of bismuth, iron, zinc, copper, vanadium, chromium, manganese, cobalt or mixtures thereof, iron oxide films with or without minor proportions of tin oxide, and titanium oxide films. Films containing cobalt oxide as a major ingredient with or without minor proportions of nickel oxide, mixtures of cobalt oxide with nickel and iron oxides, or mixtures of cobalt oxide with nickel and tin oxides, are particularly effective.

Such films having the property of screening heat rays are particularly useful when applied in the form of continuous bands extending across the upper portion of vehicle viewing closures, particularly windshields, sidelights and backlights of automobiles that have portions extending into the roof. With the use of increased areas of glass in automobiles, it has become necessary to insure that the viewing closures are capable of screening a relatively high proportion of the infrared radiation, especially in their upper portions, while improving the visibility in the portion of the vehicle where these additional areas of glass replace metal areas in modern automotive styles.

While the most common method of filming glass sheets with metal oxide films has been to heat the sheets and to spray filming compositions containing a salt of the metal to be oxidized upon contact with the heated glass surface, such films may also be formed by other methods, such as vaporizing a solution of a metal salt at reduced pressures or in vacuum and blowing the vapor onto the glass sheet; spraying a composition containing a salt of the desired metal or mixture of metal salts onto a cold glass sheet followed by heating the sheet to oxidize the metal salt into the oxide; applying a film forming material in gaseous form by elevating its temperature to above its boiling point before its application; and sputtering or condensing a metal oxide onto a glass surface in a vacuum. Which method is employed in forming the metal oxide film is dependent upon the rate of production desired and the construction of equipment available.

According to the invention, a glass sheet to be bent and coated is preferably first cut to the outline desired for the bent glass sheet. The film is then applied either to the entire sheet or to that portion only desired to be coated. The coated sheet is then mounted on a glass bending mold having an upper shaping surface conforming to the shape desired for the bent glass sheet, and subjected to glass bending temperatures to cause the flat coated sheet to sag into conformity with the upper shaping surface of the bending mold.

If the sheet is to form a tempered window closure such as a backlight or sidelight of an automobile, it is subsequently tempered after the bending operation. If the sheet is to form part of a safety glass assembly such as a windshield or sidelight, the coated sheet is mounted in alignment with another precut sheet that may either be coated or uncoated and both sheets are bent simultaneously with a suitable parting material interposed between the sheets to prevent their fusing together during the bending operation. After bending is completed, the matched glass sheets are laminated to opposite surfaces of a plastic interlayer.

According to a further embodiment of the present invention, use has been made of certain specific metal oxide coatings which provide the necessary heat screening in relatively thin layers while still maintaining sufficient transparency to light rays to be acceptable for a viewing closure. Such superior coatings are also free from haze and iridescence which are present in prior metal oxide films. The latter films have to be applied in sufficient thickness to provide the necessary heat screening. Such thicknesses approach a quarter wave length of visible light, which results in iridescence. The relative thickness of such films also makes it very difficult for them to remain adhered to the glass sheet when the latter is bent, particularly on the concave surfaces. The superior properties of certain films in the various embodiments disclosed hereafter enable coated glass sheets to be bent to comparatively sharp curvatures without causing substantial deterioration of the films resulting from chipping or peeling from the glass surfaces during bending.

Typical embodiments of the present invention will be described in conjunction with the accompanying drawings. The description which follows is for the purpose of illustrating the invention rather than restricting its scope. Reference to the latter may be had from a study of the claims which accompany the present disclosure.

In the drawings forming part of the present disclosure,

FIGURE 8 is a side elevation of one embodiment of apparatus for spraying vertically supported sheets.

FIGURE 9 is a sectional view taken along the lines IX—IX of FIGURE 8.

FIGURE 10 is a sectional view similar to FIGURE 9, showing how both surfaces of a glass sheet are sprayed simultaneously.

FIGURE 11 is a cross-sectional view of a horizontally disposed glass sheet bending mold shown passing a spraying gun according to still another embodiment of this invention.

FIGURE 12 is a side elevation of apparatus for spraying a band of coating on a portion of a glass sheet and shows spray apparatus, cam control means for controlling the movement of the spray gun relative to the sheet to be bent, a conveyor and the exit end of a furnace where the glass is heated preliminary to coating.

FIGURE 15 is a fragmentary longitudinal elevation showing how the apparatus of FIGURES 12–14 is adapted for a mass production line, and includes schematic circuit diagrams of control circuitry FIGURES 15A, 15B, 15C, and 15D.

Figure 1:
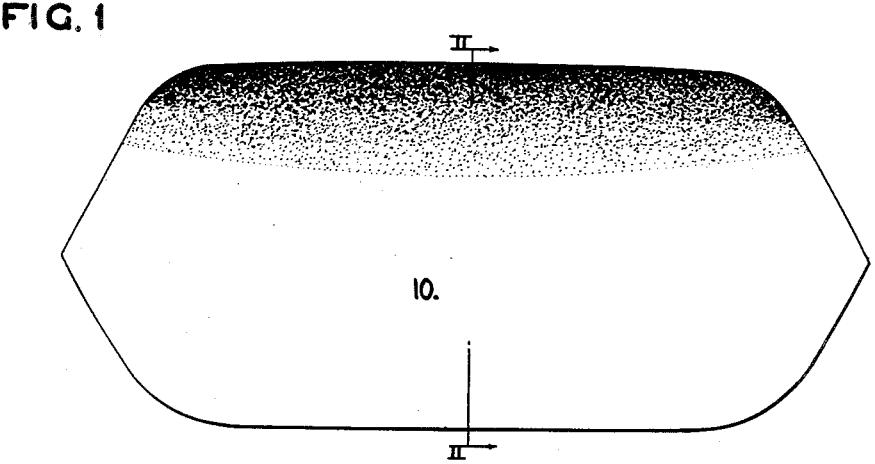
FIGURE 1 is a plan view of a precut flat glass sheet of a typical 1957 backlight pattern drawn to scale, showing the sheet coated with a continuous band of metal oxide film prior to bending.
Figure 2:
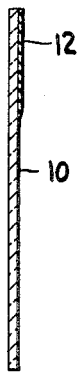
FIGURES 2, 3 and 4 are cross sectional views along the line II—II of FIGURE 1, showing various embodiments of coated glass sheets prepared for bending, the thickness of the coating being exaggerated relative to the glass sheet.
Figure 3:
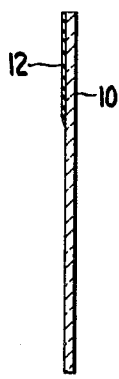
Figure 4:
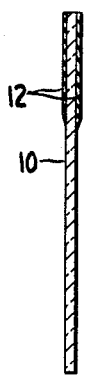

Referring to FIGURE 1, a flat glass sheet 10 is shown precut to the outline desired for the finally bent glass sheet and provided with a coating 12 of metal oxide, which may be either in the form of a band as shown or may cover the entire surface of the glass sheet. FIGURES 2 and 3 show a sheet coated on either the outer or inner surfaces, whereas FIGURE 4 shows a sheet coated on both surfaces.

It is preferable to cut the sheets to the outline desired for the bent glass sheet before filming in order to be able to cut the maximum possible number of sheets from a large block of glass. If the blocks are cut to a rectangular shape before filming and then cut after the filming is completed, a lesser number of sheets are obtainable from a given area of glass, because a large amount of glass is wasted in cutting individual outlines from rectangular blocks. Since the upper portion of one precut outline nests somewhat into the bottom portion of its neighboring sheet, it is desirable to cut many sheets to outline from a larger block of glass.

Furthermore, since filming imposes a temper on the glass sheet when the glass is filmed by heating and spraying, if the glass is cut to the proper outline after filming by such process (heating and spraying), the glass has to be cut while tempered. Tempered glass is difficult to cut. Hence, the entire operation is performed more efficiently by utilizing a single cutting operation to cut glass blocks into many flat sheets having the outline desired before filming.

The coating operation can be accomplished by causing relative movement between the glass and a spraying apparatus, and masking that portion of the glass sheet which is not desired to be coated in case a continuous band is to be applied. Alternatively, the entire glass sheet may be coated and then portions removed from the areas desired to remain uncoated. The former method is preferred where only a band of film is desired.

When it is desired to have a horizontal line of demarcation between the coated and uncoated portions of the glass in a vehicle viewing closure, the mask employed between the source of the filming composition and the glass sheet to be coated is curved to compensate for the curvature and tilting imparted to the coated glass sheet when the latter is bent and installed in a frame.

The mask may be either applied to the portions of the sheet to be kept free from coating or may be fixed to the spraying apparatus. The latter alternative may require that the spray apparatus be translated relative to the sheets to be coated if the sheets are moved continuously. The spray apparatus may be fixed in position and the sheets moved in steps, with the spraying accomplished only when the sheets are positioned properly. The number of spray guns needed depends on the area to be coated.

While single sheets of glass have been provided with films in the form of bands extending completely across the upper portion of the viewing closure as mounted in the frame to provide selective screening of the heat rays while still permitting light transmittance, other uses for similar structures have been suggested. For example, when a band covering a portion of the surface or when a continuous film covering an entire surface of a bent glass sheet is both electroconductive and transparent, the article is suitable for use as a radio antenna as well as a window closure for the vehicle.

Figure 5:
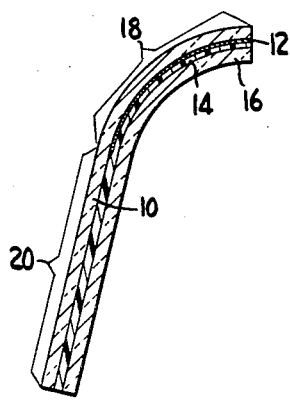
FIGURES 5, 6 and 7 are cross sectional views of various embodiments of a typical windshield provided with a band of metal oxide film in the upper portion thereof.
Figure 6:
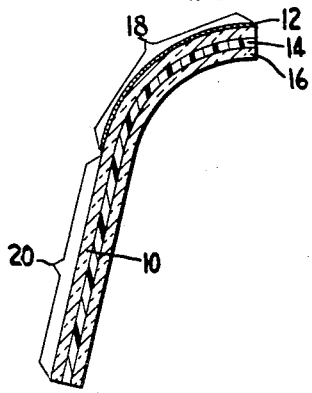
Figure 7:
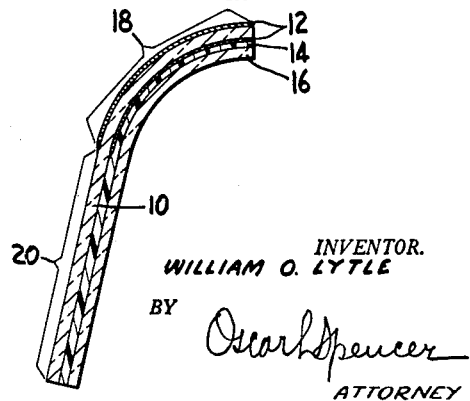

In automobile windshields and certain other vehicle closures wherein curved glass sheets are laminated to opposite surfaces of a plastic interlayer, the provision of a coating of metal oxide on at least one of the surfaces of one of the curved glass sheets in the form of a band extending across the upper portion of the viewing closure panel provides a means for shielding the interior of the vehicle from heat rays while permitting light rays to be transmitted. An example of such a structure is shown in FIGURE 5 wherein a curved glass sheet 10 provided with a coating 12 is laminated on one side of a plastic interlayer 14 and another curved sheet of glass 16 is laminated to the opposite surface of the plastic interlayer. The laminated assembly comprises an upper portion 18 and a bottom portion 20. The upper portion 18 forms the part of the viewing closure that includes a horizontal area extending into the roof and the upper portion of the vertically oblique area of a viewing closure such as a windshield. Note that the coating is limited to the upper portion 18 and does not extend into the uncoated bottom portion 20 of the windshield, which is located at the driver's eye level. In FIGURE 6, the band of metal oxide coating is located on the outer surface of the outer sheet of the laminate. The laminate of FIGURE 7 shows both inner and outer surfaces of the outer sheet coated.

In coating glass sheets preparatory to bending the coated sheets, various metal oxide films have been found to be quite suitable. However, certain films containing cobalt oxide as a major ingredient, namely, containing from about 50 percent by weight of cobalt oxide up to in excess of 99 percent by weight, have been found to be superior for heat shielding properties. These cobalt oxide films have been found to have their permanence improved by incorporation therein of some nickel oxide as disclosed in Patent 2,688,565 to Richard F. Raymond. Other additives found suitable to add to cobalt oxide films that either contain the nickel oxide or are free from nickel oxide include iron oxide and tin oxide in minor proportions, not exceeding 5 percent by weight of the metal oxide coating. The cobalt oxide constituent of these films may be either $CoO$, $Co_2O_3$ or a mixture of both oxides.

The estimated thickness of such coatings required to reduce by 25 percent the transmission of the incident infrared rays is on the order of 50 millimicrons and less, considerably below the thickness required for the same reduction in transmission by other films as estimated from their interference colors. These coatings are especially desirable by automobile manufacturers because of their neutral shade and their freedom from iridescence by virtue of their thinness.

FILMING APPARATUS

Referring to FIGURES 8 and 9, a typical spray apparatus will be described. The apparatus includes a pair of spray guns 30, each secured to a bracket housing 31 carried by a vertical post 32. The posts 32 are adjusted vertically within sleeve supports 33. An expansion spring 34 is wound about each post 32 to extend between a bracket housing 31 and a sleeve 33. Bracket housings 31 are pivotally adjustable about posts 32, their orientation being fixed by set screws 35. Flanges 36 at the bottom of posts 32 and flanges 37 at the top of sleeves 33 cooperate to provide stops limiting upward movement of the spray gun support posts.

The spray guns are provided with baffle plates 38 secured to the supporting structure of the gun by means of a baffle support structure 39. The purpose of baffles 38 is to delineate one boundary of the spray.

The spraying apparatus includes a carriage 40 for conveying the glass sheets through a heating lehr and a spraying station. The carriage is supported by an overhead monorail 42 and includes tongs 44 which grip the upper edge of glass sheets 10 to carry the latter through the glass treating apparatus.

The carriages also include a cam rail 46 curved longitudinally of the monorail. Depending supports 48 secured at their upper ends to the overhead portion of the carriage support the cam rail in its desired position in alignment with the top of the pivoted spray guns. The bracket housings 31, the posts 32 and the spray guns 30 are urged upwardly against the cam rail 46.

The purpose of the curved cam rail 46 and its supporting structure 48 is to control the vertical position of the spray relative to the passing sheet so that the cut-off line between the coated and uncoated areas is curved in such a manner that when the sheet is subsequently bent and installed in an automobile frame, it has a substantially horizontal cut-off line between the coated and uncoated regions. A different shaped cam is required for each separate pattern to produce a cut-off line that is exactly horizontal in the installed sheet. Therefore, the cam and its supports are so constructed that they are easily detachable from the overhead carriage.

It has been found that the cut-off line of moderately bent sheets does not depart too greatly from a straight horizontal cut-off line when the sheets are translated past a fixed spray gun. In such cases, the cam rail 46 and its support 48 are omitted and the vertical support posts 32 fixed to sleeves 33.

In spraying vertically supported sheets, it has been found desirable to orient one of the spray guns at an upward angle on the order of 30 degrees with the plane of the glass sheet and the other spray gun at an angle less than 30 degrees. FIGURE 10 shows how the vertical support apparatus can be used to coat bands of film on the upper edges of opposite surfaces of a glass sheet. The spray guns are angled upwardly as in the previous embodiments to avoid the possibility that drippings will contact the sheets.

In the embodiments of FIGURES 8, 9 and 10, the sheet is conveyed on a monorail 42 through a heating zone where the glass temperature is raised to at least 400° F. and below the temperature at which the glass becomes molten. The heated sheet is then conveyed through the spraying guns at a speed sufficient to form a band of film having a thickness below 80 millimicrons, preferably on the order of 40 to 50 millimicrons in order to avoid iridescence, and to minimize film crazing when the filmed sheet is subsequently bent to sharp curvatures, i.e., on the order of 9 inch radius of curvature or less.

Another spraying method found to be quite suitable for large scale production involves mounting the flat glass sheet 10 on a support mold 60 having a continuous rail 62 braced by reinforcing rods 64. In such apparatus, the glass sheet 10 is conveyed horizontally through a heating lehr where the sheet is heated to the proper temperature and then moved past one or more spray guns 30. The spray guns 30 are oriented to direct the spray along a central axis disposed at an acute angle transversely of the longitudinal dimension of the sheets. A baffle sheet 66 has been found necessary to prevent drippings from the spray guns onto the uncoated portion of the glass sheet. The baffle sheet is interposed between the spray gun and the path of movement of the uncoated portion of the glass sheet.

After the sheets are coated by spraying, whether by the vertical or horizontal techniques described above, they are permitted to be cooled sufficiently to be handled and then are mounted on conventional sectionalized bending molds and subjected to a bending operation such as described in Black Patent 2,736,140.

Example I

Glass sheets having a nominal thickness of ¼ inch and a composition consisting essenitally of the folllowing parts by weight:

|  | Percent |
| --- | --- |
| $SiO$ | 71.47 |
| $Na_2O$ | 13.11 |
| (including about 0.5% $K_2O$ impurities) | |
| $CaO$ | 11.67 |
| $MgO$ | 2.40 |
| $Na_2SO_4$ | 0.48 |
| $NaCl$ | 0.12 |
| $Al_2O_3$ | 0.19 |
| (including about 0.02 to 0.03 $TiO_2$ and about 0.01% $Zr_2O_3$ impurities) | |
| $Fe_2O_3$ | 0.56 | were coated with various heat absorbing metal oxide film forming compositions. The glass sheets were heated for about five minutes in a tunnel-like furnace held at a controlled temperature of 1180° F. The sheets were supported at their upper ends by means of tongs suspended from monorails. For flat glass sheets approximately 32 inches wide and 71 inches long cut to the pattern desired for a backlight, about 50 grams of composition were sprayed on each plate coated. The suspended glass sheets were moved out of the heating furnace and moved past fixed spraying guns at a speed of about 12 inches per second.

The guns were directed on a section about 9 inches wide along the top edge of the plate. These guns were angled upwardly and contacted the plate at about a 30 degree angle with the glass surface. Two guns were used. In some instances one of the two guns was directed at a smaller angle than 30 degrees with the glass surface. A shield was used to baffle the lower portion of the glass from the spray. Shielded spray guns so disposed produced bands in the upper portion of the coated glass sheets having slightly graduated thicknesses and a moderately sharp cut-off. After the spraying operation was completed, the glass sheets were mounted on bending molds and conveyed transversely through a bending lehr in the manner presently accomplished in the glass bending art.

Example II

The glass sheets have also been sprayed after mounting on a horizontal edge support structure. The plate, after traveling through a lehr-type furnace, was moved past a spray gun set-up where the spray was applied at an acute grazing angle relative to the horizontally disposed glass sheet. After the band of coating was applied, the sheets were removed from the support and placed upon conventional bending molds and conveyed through a horizontal disposed bending lehr.

Example III

Glass sheets have also been coated by heating the sheet and then spraying the heated sheet with a filming composition sprayed from a moving gun directed at a low grazing angle toward the zone where coating was desired. The filmed sheets were then mounted on sectionalized bending molds and bent according to current practices involving conveying the glass laden mold through a lehr, gradually heating the sheet to glass softening temperature and causing the sheet to conform to an upper mold shaping surface by a combination of heat sagging and mechanical force.

After the sheets were coated and bent, the thickness of the films formed was estimated by referring to the experience gained from experiments listed below, the color of the film noted, its luminous transmittance determined by photometric reading and total energy transmittance estimated by use of a projector lamp disposed on one side of the coated sheet and a radiomatic thermopile located at the other side. The following Table I shows various filming compositions and the absorption characteristics of the films formed from such compositions. The nature of the filming composition, particularly the cation of the metal salt, determined the thickness needed to produce a film having the desired reduced transmission coefficient. Varying the filming technique between Examples I, II and III did not affect the film characteristics appreciably.

Example IV

Glass sheets have been sprayed by mounting a flat glass sheet on a sectionalized bending mold 100 comprising a central molding section 102 including a pair of laterally spaced, longitudinally extending rails 103 and 104 rigidly mounted to a cradle support structure 106. The cradle support structure comprised a pair of horizontal end members 107 which extend across the ends of the cradle support structure 106 to ride on stub rolls 108. A horizontal member 110 extends longitudinally inwardly from each end of each horizontal end member 107. An obliquely downwardly extending connecting member 112 is connected to the inward extremity of each horizontal member 110. The lowermost portion of each connecting member 112 is interconnected to the lowermost portion of its longitudinally opposite connecting member by a longitudinally extending horizontal frame member 114. Additional braces 115 were used to interconnect the horizontal members 110 and connecting members 112 to reinforce the frame structure. Posts 116 extend downwardly from center section rails 103 and 104 of central molding section 102 to provide a support therefor on the horizontal frame members 114.

The sectionalized mold 100 also includes wing sections 118 pivotally connected at hinges 120 to center mold section 102. Counterweighted lever arms 122 extend inwardly from the wing sections 118 on the side opposite hinges 120 to provide force tending to raise each wing section 118 into the upward position depicted in phantom in FIGURE 13. The central mold section rails 103 and 104 and the wing sections 118 have upper edges that form a substantially continuous skeleton shaping surface when the wing sections are moved upwardly.

Stub rolls 108 form a horizontal conveyor extending through a furnace 124 of tunnel-like configuration. The stub roll conveyor extends beyond the exist door 126 of furnace 124 into a spraying station generally depicted by the reference character 130.

The spraying station 130 comprises a spray gun 132 provided with suitable air hose 134 and spray hose 136 for introducing the components of the spray composition into a mixing chamber 138 of the spray gun 132 under suitable pressure. A spray gun orifice 140 extends from chamber 138 to provide a directed opening. The axis of the orifice 140 determines the axis along which the spray gun dispenses a spray of film forming composition. The orifice is disposed at an acute angle to the horizontal plane of the stub roll conveyor, which is also the plane of support for the glass sheet.

The spray gun 132 is attached to a horizontal bar 142 which, in turn, is attached to a vertical bar 144. A curved bar 146 is also attached to the spray gun to help provide a supporting frame which hangs downwardly from an overhead bar 148. The latter extends longitudinally of the path of the stub roll conveyor provided by stub rolls 108. A brace 149 is included to improve the rigidity of the spray gun supporting structure. The uppermost portions of the vertical bar 144 and curved bar 146 are externally threaded and the horizontal overhead bar is apertured to receive the horizontal threads. Set screws 151, 152, 153 and 154 adjust the vertical positions of the threaded upper ends of vertical bar 144 and the curved bar 146 relative to the horizontal bar 148, thus controlling the vertical position of the spray gun relative to the path traversed by the glass sheet supported on the sectionalized mold 100. Additional adjustment screws are carried in an adjustment mechanism 155 for determining the angularity of the spray gun relative to the horizontal plane of the glass sheet to be sprayed. An acute angle of between 15° and 45° is the optimum orientation as explained in copending application Serial No. 698,173, filed November 22, 1957, for coating glass sheets, now Patent No. 3,004,875.

The horizontal overhead bar 148 extends longitudinally forwardly of the exit end of the furnace and slides within sleeves 156 and 158. A cam follower 160 extends vertically downwardly from bar 148 and is secured thereto. A cam plate 162 is rigidly supported on a rigid support structure 164. Cam plate 162 extends in a horizontal plane and has a curved edge surface 166 (FIG. 14) corresponding to the path desired for movement of the spray gun orifice 140 relative to a glass sheet G to be partially coated.

Sleeves 156 and 158 are securely fastened to a horizontal platform 168 at the upper portion of a carriage 170 having wheels 172 that ride on rails 174 supported on the rigid support structure 164. Rails 174 extend transversely of the path of movement provided by the stub roll conveyor formed from stub rolls 108.

Hook eyes 176 and 178 are attached to sleeve 156 and cam follower 160, respectively. A spring 180 interconnects hook eyes 176 and 178. An additional hook eye 182 may be provided for manual reciprocation of carriage 170 along rails 174 by means of a hook at the end of a long pole which engages hook eye 182.

Using apparatus described above, sectionalized molds 100 each supporting a flat glass sheet G of plate glass of nominal thickness of ¼ inch, 6 feet long and 14 square feet in area at the longitudinal extremities of center section rails 103 and 104 and at the longitudinal mold extremities were heated in a furnace 124 for four minutes at an ambient temperature of 1250° F. Under these circumstances, the sheets were heated to a surface temperature of about 1120° F. At this point, furnace exit doors 126 were opened and the glass laden molds were run out very quickly to the spraying stations 130 and stopped. Either spray composition 1 or 11 from Table I was dispensed through orifice 140 of the spray gun 132 while reciprocating carriage 170 on rails 174. Spring 180 caused cam follower 160 to follow the surface 166 of cam 162, thus causing the horizontal overhead bar 148 to move along its longitudinal axis in response to the reciprocation of carriage 170 along carriage rails 174 and cause spray gun 132 to follow an arcuate path along the longitudinal dimension of the sheet.

Approximately 100 grams of solution was applied along a band having an average width of about thirteen inches during a spray period not exceeding twenty seconds. Immediately upon completing the spraying operation, the molds supporting the partially supported glass sheets were conveyed into a bending furnace where the glass was heated to sufficient temperature to bend the sheet into conformity with the mold shaping surface and immediately thereafter subjected to quenching by an air quench.

The coated tempered glass sheets had coatings of about fifty millimicrons in thickness. The bands of coating had a transmission coefficient of between 25% and 30% of visible light and 18% to 24% total energy transmission after subsequent bending and tempering.

The glass composition used for the coated articles has some effect on the relative transmission. The following Table III discloses the relative efficiency of clear plate glass coated with a coating of the type formed by spraying a composition containing cobalt acetate with similar compositions sprayed on tinted glass. Tinted glass compositions differ from the clear glass principally by the amount

TABLE I.—FILMING COMPOSITIONS

|   | | Thickness, Millimicrons | Color | Luminous Transmittance, percent | Total Solar Energy Transmittance, percent |
|---|---|---|---|---|---|
| 1 | 600 grams ethyl alcohol ($C_2H_5OH$)<br>200 grams cobalt acetate ($(CH_3COO)_2Co$)<br>60 grams acetic acid ($CH_3COOH$) | 40–50 | Silvery to Colorless | 26 | 24 |
| 2 | Composition 1 plus 20 grams nickel acetate ($(CH_3COO)_2Ni$). | 40–50 | do | 27 | 22 |
| 3 | Composition 2 plus 4 grams ferric acetate ($(CH_3COO)_3Fe$). | 40–50 | do | 26 | 19.5 |
| 4 | 75 grams methyl alcohol ($CH_3OH$)<br>7.5 grams acetic acid ($CH_3COOH$)<br>25 grams cobalt acetate ($(CH_3COO)_2Co$) | 40–50 | do | 26 | 22 |
| 5 | Composition 4 plus 2.5 grams nickel acetate ($(CH_3COO)_2Ni$). | 40–50 | do | 26 | 19 |
| 6 | Composition 5 plus 0.5 gram ferric acetate ($(CH_3COO)_3Fe$). | 40–50 | do | 25 | 19 |
| 7 | Cobalt naphthenate dissolved in mineral spirits (at least 6 percent Co by weight). | 40–50 | do | 27 | 23 |
| 8 | 73 grams stannic chloride<br>20 grams antimony trichloride<br>15 grams hydrochloric acid (37%)<br>70 grams water | 240 | 2nd order red | 26 | 20 |
| 9 | 73 grams stannic chloride<br>12 grams antimony trichloride<br>15 grams bismuth chloride<br>15 grams hydrochloric acid<br>70 grams water | 400 | 3rd order red | 27 | 17 |
| 10 | 2,250 cubic centimeters stannic chloride<br>1,765 cubic centimeters water<br>565 cubic centimeters methyl alcohol<br>160 grams phenyl hydrazine hydrochloride<br>230 cubic centimeters aqueous solution containing 16% by weight of dioctyl sodium sulfo succinate. | 900–1,000 | 7 orders thick | 52 | 30 |
| 11 | 19 parts by volume of cobalt occate solution (6% cobalt by weight in xylol).<br>1 part by volume of nickel naphthenate solution (6% nickel by weight in xylol). | 40–50 | Silvery to Colorless | 25–30 | 18–24 |

The following experiments were performed to establish the thickness of silvery, non-iridescent films formed by applying compositions 1 through 7 above. It has already been established that the interference colors present in thin films is indicative of the film thickness. The thickness of iridized films may be gauged by the apparent color of the film caused by interference of light reflected therefrom. As the thickness of the film increases, its apparent color changes and the order or succession of the colors with increasing thickness is analogous to that of the well-known Newton rings described in "A Treatise on Light," R. A. Houston, Longmans, Green & Company, Ltd., (1938), page 147.

Thicker films have less transmission than thinner films. Simple calculation shows that the first order red corresponds to a thickness of approximately 80 millimicrons. By comparing the color of iridescent and non-iridescent cobalt oxide films of different thicknesses with the percentage transmission of visible light through filmed samples of tinted glass from Table IV, it was concluded that the silvery, non-iridescent films must have a thickness below 50 millimicrons.

TABLE II

| Color | Visible Transmissivity, percent | Thickness |
|---|---|---|
| Silvery, Non-iridescent | 24 | 40–50 millimicrons (estimated). |
| Amber, Non-iridescent | 19–20 | 60 millimicrons (estimated). |
| Red (1st order) | 16–17 | 80 millimicrons (calculated). |
| Green (2nd order), Iridescent | 10–11 | 200 millimicrons. |
| Red (2nd order), Iridescent | 6–7 | 230 millimicrons. |
| Green (3rd order), Iridescent | 4–5 | 330 millimicrons. | of iron oxide contained in the glass composition as shown in Table IV.

TABLE III

| Film | Glass | Luminescence Transmittance, percent | Total Solar Ultraviolet Transmittance, percent | Total Solar Infrared Transmittance, percent |
|---|---|---|---|---|
| 3 | Tinted | 24.2 | 8.2 | 12.5 |
| 5 | Tinted | 22.1 | 7.2 | 11.0 |
| 4 | Clear | 26.9 | 14.5 | 40.3 |

TABLE IV.—TYPICAL CLEAR AND TINTED GLASS COMPOSITIONS

| Ingredient | Clear, percent (weight) | Tinted, percent (weight) |
|---|---|---|
| $SiO_2$ | 70–75 | 70–75 |
| $Na_2O$ | 10–15 | 10–15 |
| $CaO$ | 5–15 | 5–15 |
| $MgO$ | 2–10 | 2–10 |
| $Fe_2O_3$ | 0 to 0.2 | 0.25–1 |

From the above experiments it is obvious that the harmful ultraviolet and infrared radiations may be screened out more effectively when tinted glass is coated with the coating utilized than when clear glass is coated with the coating described. Furthermore, such beneficial screening is accomplished with only a slight effect on the transmission of visible light through the coated glass assembly.

Films having the superior heat screening properties have been formed by spraying compositions that include an organic cobalt salt as a major ingredient. These films have been studied by X-ray diffraction and electron microscope techniques and appear to be composed of submicroscopic amorphous particles. While their chemical composition is unknown, it is believed that cobalt oxide forms a major ingredient of the film composition.

The present invention has provided a novel method of producing articles comprising curved coated glass sheets involving first coating at least an area of the sheet and then bending the coated sheet. A particularly outstanding utility is obtained from this inventive concept when low heat transmission films having visual transparency in thicknesses less than 80 millimicrons by spraying film forming compositions containing organic cobalt salts onto heated glass sheets before bending the latter. Such bent coated sheets are especially suitable for use as vehicle window closures, especially when the coating is in the form of a band extending across the upper portion of the bent sheet.

The superior coatings formed by spraying compositions 1 through 7 and 11 have been tested in an accelerated test machine where the coatings have been subjected to thousands of hours of accelerated testing involving alternate ultraviolet irradiation and water spraying, estimated to be equivalent to 10 years normal exposure without appreciable deterioration of the film.

Figure 13:
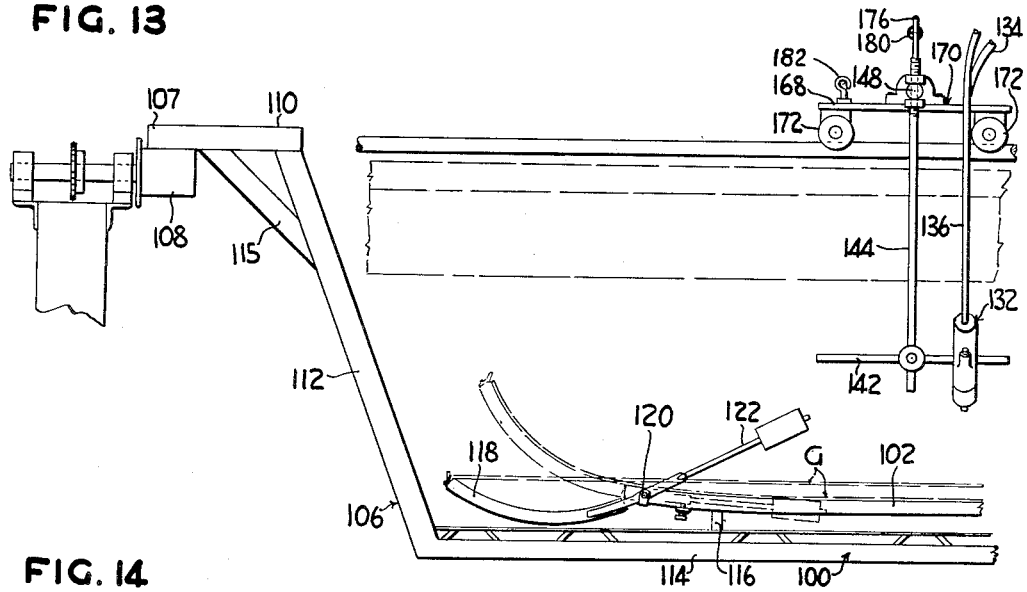
FIGURE 13 is a fragmentary end elevation looking along the lines XIII—XIII of FIGURE 12.
Figure 14:
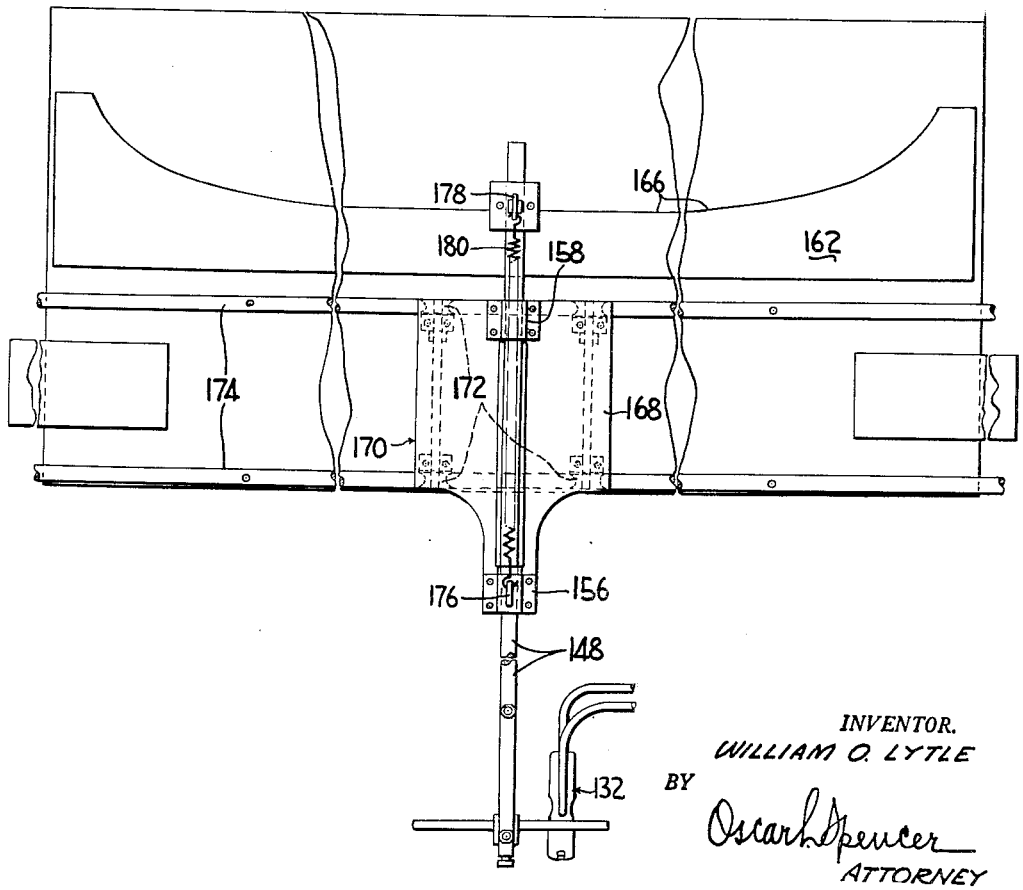
FIGURE 14 is a plan view of the spray apparatus and cam control means depicted in FIGURES 12 and 13.

FIGURE 15 discloses a fragmentary longitudinal elevation of apparatus embodying the teachings of the present invention in a mass production line. At the extreme left of this figure is a loading station 184 where glass sheets are mounted on sectionalized bending molds 100 carried by cradle support structures 106 as shown in FIGURES 12–14.

The stub roll conveyor 108 includes a high speed run-in section 185 for conveying a glass laden mold and carriage into the furnace 124 whenever a preceding mold and its cradle support structure 106 clear a limit switch LS–1 in furnace 124. This prepares a circuit 15A to actuate high speed conveyor section 185 and the opening of entrance door 125 of furnace 124 for a period sufficient for a cradle support structure 106 to enter the furnace completely. The portion of the stub roll conveyor 108 within the furnace 124 operates at a slow, continuous speed to convey the cradle supports 106 therethrough while exposed to the furnace heating elements.

Near the exit end of the furnace and extending into the spraying station 130 is a high speed transfer section 186. The operation of the high speed transfer section is actuated by one or more sensing elements 188 of the type described in application Serial No. 536,080 of Florian V. Atkeson, filed September 23, 1955, now Patent No. 2,917,871, the disclosure of which is incorporated herein by reference. Both the run-in section 185 and the transfer section 186 are capable of overriding the normal speed of the conveyor 108 when actuated. When the sensing elements 188, which are trained on the upper surfaces of the glass sheet to read their temperature, determine that a glass sheet has been heated to its desired tempearture for spraying, it actuates the opening of the furnace exit door 126 and high speed transfer section 186 through circuit 15B to bring the glass sheet into proper alignment with the spray gun 132 at the spraying station 130.

The leading edge of the cradle support structure actuates a trip switch S in circuit 15C to reciprocate the car 170 along tracks 174 and to actuate the spray gun 132 to dispense spray. Automatic drive means (not shown), such as a motor or a drive chain such as depicted in U.S. Patent No. 2,899,929 of William J. Monroe, dated August 18, 1959, may be used to reciprocate the car 170, when the latter is automated. A time control determines the duration of the spray. The spray gun thus moves along a curved path transversely of the longitudinal axis of the stub roll conveyor 108 defined by cam plate 162 and dispenses spray for a time sufficient to provide a coating of requisite thickness on a curved elongated strip extending along one edge of the glass sheet to be coated.

The high speed transfer section 186 of conveyor 108 continues through a bending lehr 190 having an entrance door 191. Thus, when the transfer section 186 transfers a mold from furnace 124 to spraying station 130, it simultaneously urges the immediately preceding mold to move from spraying station 130 to bending lehr 190. Hence, actuation of entrance door 191 is synchronized with actuation of furnace exit door 126 and transfer section 186 by means of control circuit 15B actuated by element 188.

The remaining conveyor rolls of stub roll conveyor 108 within the bending lehr 190 operate continuously at low speed, except when overridden by a high speed run-out section 196 which is controlled by one or more thermo-responsive sensing elements 198, similar to elements 188 in furnace 124, trained on the surface of the glass sheets passing therethrough.

High speed run-out section 196 extends from the bending lehr 190 to a tempering station 200. When the thermo-responsive sensing element 198 determines that a glass sheet has attained proper temperature for tempering, it actuates the high speed run-out section 196 of stub roll conveyor 108 to move a carriage 106 from the bending lehr 190 to the tempering station 200. Its circuit 15D also controls the opening and closing of an exit door 202 of the lehr 190 and the onset of air blasts through upper and lower plenum chambers 204 and 206, respectively, that comprise the tempering station 200. High speed run-out section 196 operates intermittently to remove a previous carriage 106 from the tempering station 200 to an unloading station 210 when a new mold is being transferred from the exit portion of the bending lehr 190 to the tempering station 200.

Furnace 124 and bending lehr 190 are provided with heating elements that are adjusted to provide suitable temperature patterns along and across the path of movement taken by the glass sheets. By proper adjustment of the heating pattern in furnace 124 relative to that in lehr 190, glass sheets are removed from the bending lehr 190 sufficiently rapidly to permit clearance for each successive mold to traverse the transfer section 186 from the spraying station 130 to bending lehr 190 in response to the intermittent movement of transfer section 186 actuated by thermo-responsive element 188 without having adjacent molds collide near the entrance of lehr 190. This temperature control is very important because the heating elements in furnace 124 must be adjusted to raise the temperature of the glass sheets merely to their film forming temperature, which is considerably below the glass softening point, whereas the heating elements in the bending lehr 190 raise the glass sheets to their softening point, and, after bending, to their tempering temperature. Thus, the heating elements in bending lehr 190 must be energized to impart far greater heat outputs than the heating elements in the furnace 124.

The present description of apparatus is for the purpose of illustration rather than limitation. The claimed subject matter, which follows this description and which is intended to cover obvious equivalents of the illustrative embodiments, should be referred to for determining the extent of this invention.

What is claimed is:

1. Apparatus for forming a band of metal oxide film having a curved cut-off line on an elongated flat glass sheet comprising a heating furnace, a spraying station, conveyor means for transporting elongated flat glass sheets from said heating furnace to said spraying station, means for supporting an elongated glass sheet at said spraying station in a predetermined orientation in a plane, a spray gun spaced from said plane and oriented to direct a spray of film forming composition toward said plane, cam means extending longitudinally of the longitudinal axis of the supported glass sheet for controlling the relative position of the spray gun transversely of said supported glass sheet, and means operatively connected to said spray gun and said cam means to provide relative movement between said spray gun and said glass sheet so that a band of metal oxide film that results from contacting the heated glass sheet with the film forming composition has a curved cut-off line conforming in shape to that of the cam means.

2. Apparatus as in claim 1, wherein the spray gun is disposed relative to the glass sheet to direct a spray at an acute angle with said plane.

3. Apparatus as in claim 1, including means operatively associated with the spray gun to move the latter relative to the glass sheet during spraying.

4. Apparatus for forming a band of metal oxide film having a curved cut-off line on an elongated glass sheet comprising a horizontally extending, tunnel-like, heating furnace, a skeleton mold for supporting a flat glass sheet in a substantially horizontal plane, a spraying station located beyond said furnace, a conveyor extending in a horizontal plane through said furnace and said spraying station for conveying said skeleton mold therethrough, said spraying station comprising a spray gun located above said conveyor and disposed to spray a metal oxide film forming composition at an acute angle toward said conveyor, cam means having a curved cam surface extending transversely of said conveyor and spaced therefrom for controlling the position of said spray gun longitudinally and transversely of said conveyor, means operatively connected to said spray gun and said cam means to provide to-and-fro movement for said spray gun along a curved path parallel to said curved cam surface, which path is spaced from said horizontal plane of said conveyor, and means for dispensing said metal oxide film forming composition through said spray gun while the latter is provided with said to-and-fro motion.

5. Apparatus as in claim 4, further including a tunnel-like glass bending lehr and a tempering station located successively beyond said spraying station, wherein said conveyor traverses in succession said furnace, said spraying station, said lehr and said tempering station.

6. Apparatus as in claim 5, wherein said skeleton mold is provided with a plurality of sections tending to move from an open position for supporting a rigid, flat glass sheet for bending into a closed position defining a curved shaping surface conforming to the shape of the bent sheet when the glass sheet softens, said furnace being provided with means for heating the glass sheet to film forming temperature but below its softening point and thermoresponsive sensing means trained on the path taken by said glass sheets through said furnace, said conveyor being provided with a high speed transfer section extending from said furnace through said spraying station, said thermo-responsive means being operatively coupled to said high speed transfer section to actuate the latter in response to its sensing that the glass sheet attains film forming temperature to transfer the heated sheet from said furnace to said spraying station before the glass sheet reaches its softening point.

7. A method of providing a glass sheet with a continuous band of film extending along a portion thereof, comprising heating a glass sheet below the glass softening point and to a temperature sufficient to convert a film forming composition into a metal oxide film on contacting said heated glass sheet with said composition, supporting the heated glass sheet in a plane, directing a spray of said film forming composition toward the glass sheet, and providing relative motion along a curved path of relative movement between the glass sheet and the spray, said spray direction and said relative motion being so chosen that a portion of the margin of the spray intersects the glass sheet along a curved line therealong to partially coat the glass sheet and limiting the duration of exposure of each portion of the glass sheet to said film forming composition so that the thickness of the applied film does not exceed 80 millimicrons.

8. A method as in claim 7, further including heating the partially coated glass sheet to glass softening temperature and bending the heat-softened, partially coated glass sheet, the curvature of the cut-off line being of such a configuration that the cut-off line appears to lie in a substantially horizontal plane after the glass sheet is bent and mounted in a glazing frame.

9. A method according to claim 7, wherein the film forming composition contains a cobalt compound capable of forming a heat absorbing film containing cobalt oxide as a major ingredient.

10. A method as in claim 7, wherein the glass sheet is supported on a sectionalized bending mold while exposed to said spray.

11. A method as in claim 10, wherein the partly coated glass sheet is bent to conform to the sectionalized bending mold after the coating has been applied thereto.

References Cited in the file of this patent

UNITED STATES PATENTS

| | | |
|---|---|---|
| 2,293,881 | Bailey | Aug. 25, 1942 |
| 3,021,227 | Richardson | Feb. 13, 1962 |

FOREIGN PATENTS

| | | |
|---|---|---|
| 739,565 | Great Britain | Nov. 2, 1955 |